United States Patent [19]

Sachs et al.

[11] Patent Number: 5,560,028

[45] Date of Patent: Sep. 24, 1996

[54] SOFTWARE SCHEDULED SUPERSCALAR COMPUTER ARCHITECTURE

[75] Inventors: Howard G. Sachs, Belvedere; Siamak Arya, Palo Alto, both of Calif.

[73] Assignee: Intergraph Corporation, Huntsville, Ala.

[21] Appl. No.: 422,753

[22] Filed: Apr. 13, 1995

Related U.S. Application Data

[63] Continuation of Ser. No. 147,800, Nov. 5, 1993, abandoned.

[51] Int. Cl.⁶ .................. G06F 9/00; G06F 9/38
[52] U.S. Cl. .................. 395/800; 364/DIG. 1; 364/DIG. 2; 364/262.4; 364/263.3; 364/946.2; 364/946.9
[58] Field of Search .................. 395/800; 364/DIG. 1, 364/DIG. 2

[56] References Cited

U.S. PATENT DOCUMENTS

| | | | |
|---|---|---|---|
| 4,437,149 | 3/1984 | Pomerene et al. | 364/200 |
| 4,847,755 | 7/1989 | Morrison et al. | 364/200 |
| 4,933,837 | 6/1990 | Freidin | 364/200 |
| 5,055,997 | 10/1991 | Sluijter et al. | 364/200 |
| 5,081,575 | 1/1992 | Hiller et al. | 395/325 |
| 5,101,341 | 3/1992 | Circello et al. | 395/375 |
| 5,121,502 | 6/1992 | Rau et al. | 395/8 |
| 5,129,067 | 7/1992 | Johnson | 395/375 |
| 5,151,981 | 9/1992 | Wescott et al. | 395/375 |
| 5,179,680 | 1/1993 | Colwell et al. | 395/425 |
| 5,197,137 | 3/1993 | Kumar et al. | 395/375 |
| 5,203,002 | 4/1993 | Wetzel | 395/800 |
| 5,214,763 | 5/1993 | Blaner et al. | 395/375 |
| 5,226,169 | 7/1993 | Gregor | 395/800 |
| 5,233,696 | 8/1993 | Suzuki | 395/375 |
| 5,297,255 | 3/1994 | Hamanaka et al. | 395/200 |
| 5,297,281 | 3/1994 | Emma et al. | 395/650 |
| 5,299,321 | 3/1994 | Iizuka | 395/375 |

FOREIGN PATENT DOCUMENTS

0449661A2 10/1991 European Pat. Off. .
0496928A2 8/1992 European Pat. Off. .

OTHER PUBLICATIONS

Case et al., "DEC enters microprocessor business with alpha," *Microprocessor Report* 6(3):1,6–14 (Mar. 4, 1992).
Dutton, "The design of the DEC 3000 model 500 AXP workstation," *IEEE* 1063–6390/93, pp. 449–455 (1993).
Allison, "DEC 7000/10000 model 600 AXP multiprocessor server," *IEEE* 1063–6390/93, pp. 456–464 (1993).
Grove et al., "GEM optimizing compliers for alpha AXP systems," *IEEE* 1063–6390/93, pp. 465–473 (1993).
Minagawa, Kenji, et al., *IEEE Pacific Rim Conference on Communications, Computers and Signal Processing*, May 9–10, 1991, "Pre–decoding mechanism for superscalar architecture", pp. 21–24.
De Gloria, Alessandro, et al., *Processing Comp. Euro. 1992*, May 4, 1992, "A programmable instruction format extension to VLIW architectures", pp. 35–40.

(List continued on next page.)

*Primary Examiner*—Tod R. Swann
*Assistant Examiner*—Valerie Darbe
*Attorney, Agent, or Firm*—Townsend and Townsend and Crew, LLP

[57] ABSTRACT

A computing system is described in which groups of individual instructions are executable in parallel by processing pipelines, and instructions to be executed in parallel by different pipelines are supplied to the pipelines simultaneously. During compilation of the instructions those which can be executed in parallel are identified. The system includes a register for storing an arbitrary number of the instructions to be executed. The instructions to be executed are tagged with pipeline identification tags and group identification tags indicative of the pipeline to which they should be dispatched, and the group of instructions which may be dispatched during the same operation. The pipeline and group identification tags are used to dispatch the appropriate groups of instructions simultaneously to the differing pipelines.

23 Claims, 11 Drawing Sheets

OTHER PUBLICATIONS

Bakoglu, H. B., et al., "The IBM RISC System/6000 Processor: Hardware Overview," *IBM J. Res. Develop.* (Jan. 1990) 34(1):12–22.

Fisher, Joseph A., et al., "Parallel Processing: A Smart Compiler and a Dumb Machine," Proceedings of the ACM SIGPLAN '84 Symposium on Compiler Construction, *SIGPLAN Notices* (Jun. 1984) 19(6):37–47.

Agerwala, Tilak, et al., "High Performance Reduced Instruction Set Processors," IBM Research Report No. 12434 (#55845) (Jan. 9, 1987), IBM Thomas J. Watson Research Center, Yorktown Heights, New York.

Patterson, David A., et al., *Computer Architecture—A Quantitative Approach*, Morgan Kaufmann Publishers, Inc., San Mateo Calif., 1990, Table of Contents, pp. xi–xv.

S = 0  0  0  0  0  0  0  0

| W0 | W1 | W2 | W3 | W4 | W5 | W6 | W7 |

[ GROUP 0 ]

| W0 | W1 | W2 | W3 | W4 | W5 | W6 | W7 |

[ GROUP 0 ]  [ GROUP 1 ]  [ GROUP 2 ]

| W0 | W1 | W2 | W3 | W4 | W5 | W6 | W7 |

| 63 | 59 | 56 | | 0 |
|---|---|---|---|---|
| P | S | INSTRUCTION | | |
| 4 | 3 | 57 | | |

*FIG. 6*

GROUP TAG

CLOCK 1 —   ALU       ALU       LOAD      STORE

CLOCK 2 —   LOAD      FP        FP

CLOCK 3 —   BRANCH

SOFTWARE SCHEDULED SUPERSCALAR COMPUTER ARCHITECTURE

This is a continuation of application Ser. No. 08/147,800 filed Nov. 5, 1993, now abandoned.

BACKGROUND OF THE INVENTION

This invention relates to the architecture of computing systems, and in particular to an architecture in which groups of instructions may be executed in parallel, as well as to methods and apparatus for accomplishing that.

A common goal in the design of computer architectures is to increase the speed of execution of a given set of instructions. Many solutions have been proposed for this problem, and these solutions generally can be divided into two groups.

According to a first approach, the speed of execution of individual instructions is increased by using techniques directed to decreasing the time required to execute a group of instructions serially. Such techniques include employing simple fixed-width instructions, pipelined execution units, separate instruction and data caches, increasing the clock rate of the instruction processor, employing a reduced set of instructions, using branch prediction techniques, and the like. As a result it is now possible to reduce the number of clocks to execute an instruction to approximately one. Thus, in these approaches, the instruction execution rate is limited to the clock speed for the system.

To push the limits of instruction execution to higher levels, a second approach is to issue more than one instruction per clock cycle, in other words, to issue instructions in parallel. This allows the instruction execution rate to exceed the clock rate. There are two classical approaches to parallel execution of instructions.

Computing systems that fetch and examine several instructions simultaneously to find parallelism in existing instruction streams to determine if any can be issued together are known as superscaler computing systems. In a conventional superscaler system, a small number of independent instructions are issued in each clock cycle. Techniques are provided, however, to prevent more than one instruction from issuing if the instructions fetched are dependent upon each other or do not meet other special criteria. There is a high hardware overhead associated with this hardware instruction scheduling process. Typical superscaler machines include the Intel i960CA, the IBM RIOS, the Intergraph Clipper C400, the Motorola 88110, the Sun SuperSparc, the Hewlett-Packard PA-RISC 7100, the DEC Alpha, and the Intel Pentium.

Many researchers have proposed techniques for superscaler multiple instruction issue. Agerwala, T., and J. Cocke [1987] "High Performance Reduced Instruction Set Processors," *IBM Tech. Rep.* (March), proposed this approach and coined the name "superscaler." IBM described a computing system based on these ideas, and now manufactures and sells that machine as the RS/6000 system. This system is capable of issuing up to four instructions per clock and is described in "The IBM RISC System/6000 Processor," *IBM J. of Res. & Develop.* (January, 1990) 34:1.

The other classical approach to parallel instruction execution is to employ a "wide-word" or "very long instruction word" (VLIW) architecture. A VLIW machine requires a new instruction set architecture with a wide-word format. A VLIW format instruction is a long fixed-width instruction that encodes multiple concurrent operations. VLIW systems use multiple independent functional units. Instead of issuing multiple independent instructions to the units, a VLIW system combines the multiple operations into one very long instruction. For example, in a VLIW system, multiple integer operations, floating point operations, and memory references may be combined in a single "instruction." Each VLIW instruction thus includes a set of fields, each of which is interpreted and supplied to an appropriate functional unit. Although the wide-word instructions are fetched and executed sequentially, because each word controls the entire breadth of the parallel execution hardware, highly parallel operation results. Wide-word machines have the advantage of scheduling parallel operation statically, when the instructions are compiled. The fixed width instruction word and its parallel hardware, however, are designed to fit the maximum parallelism that might be available in the code, and most of the time far less parallelism is available in the code. Thus for much of the execution time, most of the instruction bandwidth and the instruction memory are unused.

There is often a very limited amount of parallelism available in a randomly chosen sequence of instructions, especially if the functional units are pipelined. When the units are pipelined, operations being issued on a given clock cycle cannot depend upon the outcome of any of the previously issued operations already in the pipeline. Thus, to efficiently employ VLIW, many more parallel operations are required than the number of functional units.

Another disadvantage of VLIW architectures which results from the fixed number of slots in the very long instruction word for classes of instructions, is that a typical VLIW instruction will contain information in only a few of its fields. This is inefficient, requiring the system to be designed for a circumstance that occurs only rarely—a fully populated instruction word.

Another disadvantage of VLIW systems is the need to increase the amount of code. Whenever an instruction is not full, the unused functional units translate to wasted bits, no-ops, in the instruction coding. Thus useful memory and/or instruction cache space is filled with useless no-op instructions. In short, VLIW machines tend to be wasteful of memory space and memory bandwidth except for only a very limited class of programs.

The term VLIW was coined by J. A. Fisher and his colleagues in Fisher, J. A., J. R. Ellis, J. C. Ruttenberg, and A. Nicolau [1984], "Parallel Processing: A Smart Compiler and a Dumb Machine," *Proc. SIGPLAN Conf. on Compiler Construction* (June), Palo Alto, CA, 11–16. Such a machine was commercialized by Multiflow Corporation.

For a more detailed description of both superscaler and VLIW architectures, see *Computer Architecture—a Quantitative Approach*, John L. Hennessy and David A. Patterson, Morgan Kaufmann Publishers, 1990.

SUMMARY OF THE INVENTION

We have developed a computing system architecture, which we term software-scheduled superscaler, which enables instructions to be executed both sequentially and in parallel, yet without wasting space in the instruction cache or registers. Like a wide-word machine, we provide for static scheduling of concurrent operations at program compilation. Instructions are also stored and loaded into fixed width frames (equal to the width of a cache line). Like a superscaler machine, however, we employ a traditional instruction set, in which each instruction encodes only one basic operation (load, store, etc.). We achieve concurrence by fetching and dispatching "groups" of simple individual instructions, arranged in any order. The architecture of our invention relies upon the compiler to assign instruction sequence codes to individual instructions at the time they are compiled. During execution these instruction sequence codes are used to sort the instructions into appropriate groups and execute them in the desired order. Thus our architecture does not suffer the high hardware overhead and runtime constraints of the superscaler strategy, nor does it suffer the wasted instruction bandwidth and memory typical of VLIW systems.

Our system includes a mechanism, an associative crossbar, which routes in parallel each instruction in an arbitrarily selected group to an appropriate pipeline, as determined by a pipeline tag applied to that instruction during compilation. Preferably, the pipeline tag will correspond to the type of functional unit required for execution of that instruction, e.g., floating point unit 1. All instructions in a selected group can be dispatched simultaneously.

Thus, in one implementation, our system includes a cache line, register, or other means for holding at least one group of instructions to be executed in parallel, each instruction in the group having associated therewith a pipeline identifier indicative of the pipeline for executing that instruction and a group identifier indicative of the group of instructions to be executed in parallel. The group identifier causes all instructions having the same group identifier to be executed simultaneously, while the pipeline identifier causes individual instructions in the group to be supplied to an appropriate pipeline.

In another embodiment the register holds multiple groups of instructions, and all of the instructions in each group having a common group identifier are placed next to each other, with the group of instructions to be executed first placed at one end of the register, and the instructions in the group to be executed last placed at the other end of the register.

In another embodiment of our invention a method of executing arbitrary numbers of instructions in a stream of instructions in parallel includes the steps of compiling the instructions to determine which instructions can be executed simultaneously, assigning group identifiers to sets of instructions that can be executed in parallel, determining a pipeline for execution of each instruction, assigning a pipeline identifier to each instruction, and placing the instructions in a cache line or register for execution by the pipelines.

BRIEF DESCRIPTION OF THE DRAWINGS

FIG. 5a illustrates the frame structure for one maximum-sized group of eight instructions;

FIG. 5b illustrates the frame structure for a typical mix of three intermediate sized group of instructions;

FIG. 5c illustrates the frame structure for eight minimum-sized groups, each of one instruction;

FIG. 6 illustrates an instruction word after predecoding;

DESCRIPTION OF THE SPECIFIC EMBODIMENTS

Figure 1:
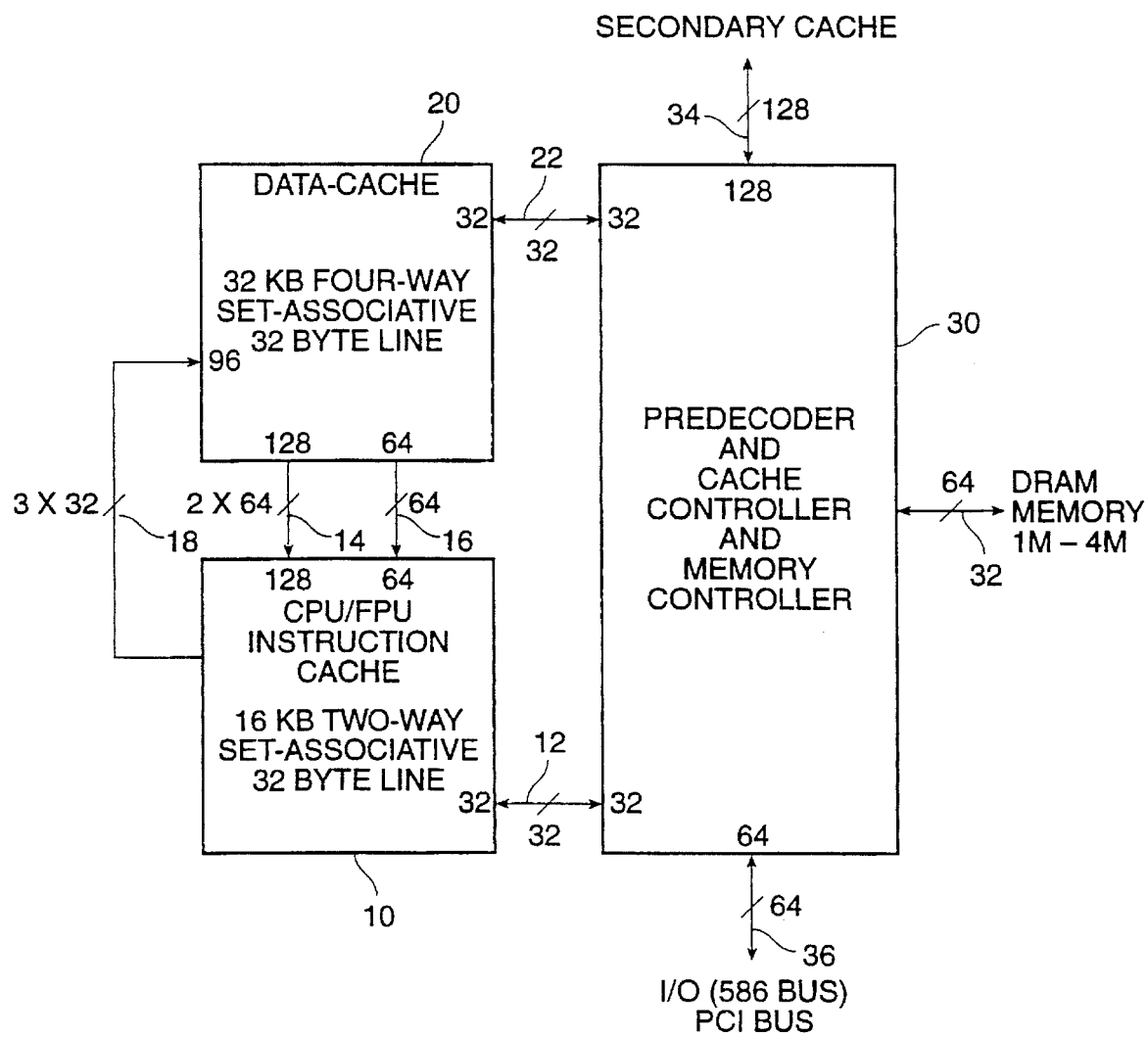
FIG. 1 is a block diagram illustrating a preferred implementation of this invention.

FIG. 1 is a block diagram of a computer system according to the preferred embodiment of this invention. FIG. 1 illustrates the organization of the integrated circuit chips by which the computing system is formed. As depicted, the system includes a first integrated circuit 10 that includes a central processing unit, a floating point unit, and an instruction cache.

In the preferred embodiment the instruction cache is a 16 kilobyte two-way set-associative 32 byte line cache. A set associative cache is one in which the lines (or blocks) can be placed only in a restricted set of locations. The line is first mapped into a set, but can be placed anywhere within that set. In a two-way set associative cache, two sets, or compartments, are provided, and each line can be placed in one compartment or the other.

The system also includes a data cache chip 20 that comprises a 32 kilobyte four-way set-associative 32 byte line cache. The third chip 30 of the system includes a predecoder, a cache controller, and a memory controller. The predecoder and instruction cache are explained further below. For the purposes of this invention, the CPU, FPU, data cache, cache controller and memory controller all may be considered of conventional design.

The communication paths among the chips are illustrated by arrows in FIG. 1. As shown, the CPU/FPU and instruction cache chip communicates over a 32 bit wide bus 12 with the predecoder chip 30. The asterisk is used to indicate that these communications are multiplexed so that a 64 bit word is communicated in two cycles. Chip 10 also receives information over 64 bit wide buses 14, 16 from the data cache 20, and supplies information to the data cache 20 over three 32 bit wide buses 18.

The specific functions of the predecoder are described in much greater detail below; however, essentially it functions to decode a 32 bit instruction received from the secondary cache into a 64 bit word, and to supply that 64 bit word to the instruction cache on chip 10.

The cache controller on chip 30 is activated whenever a first level cache miss occurs. Then the cache controller either goes to main memory or to the secondary cache to fetch the needed information. In the preferred embodiment the secondary cache lines are 32 bytes and the cache has an 8 kilobyte page size.

The data cache chip 20 communicates with the cache controller chip 30 over another 32 bit wide bus. In addition, the cache controller chip 30 communicates over a 64 bit wide bus 32 with the DRAM memory, over a 128 bit wide bus 34 with a secondary cache, and over a 64 bit wide bus 36 to input/output devices.

As will be described, the system shown in FIG. 1 includes both conventional and novel features. The system includes multiple pipelines able to operate in parallel on separate instructions. The instructions that can be dispatched to these parallel pipelines simultaneously, in what we term "instruction groups," have been identified by the compiler and tagged with a group identification tag. Thus, the group tag designates instructions that can be executed simultaneously. Instructions within the group are also tagged with a pipeline tag indicative of the specific pipeline to which that instruction should be dispatched. This operation is also performed by the compiler.

In this system, each group of instructions can contain an arbitrary number of instructions ordered in an arbitrary sequence. The only limitation is that all instructions in the group must be capable of simultaneous execution; e.g., there cannot be data dependency between instructions. The instruction groups are collected into larger sets and are organized into fixed width "frames" and stored. Each frame can contain a variable number of tightly packed instruction groups, depending upon the number of instructions in each group and on the width of the frame.

Below we describe this concept more fully, as well as describe a mechanism to route in parallel each instruction in an arbitrarily selected group to its appropriate pipeline, as determined by the pipeline tag of the instruction.

In the following description of the word, group, and frame concepts mentioned above, specific bit and byte widths are used for the word, group and frame. It should be appreciated that these widths are arbitrary, and can be varied as desired. None of the general mechanisms described for achieving the result of this invention depends upon the specific implementation.

Figure 2:
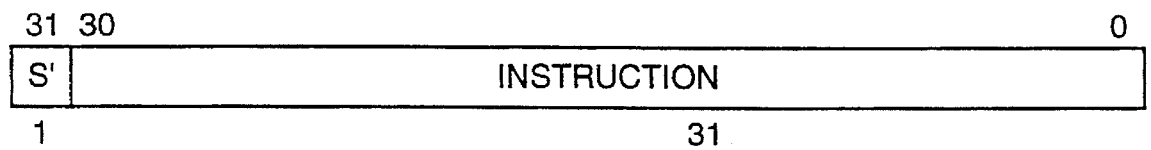
FIG. 2 is a diagram illustrating the data structure of an instruction word in this system.

In one embodiment of this system the central processing unit includes eight functional units and is capable of executing eight instructions in parallel. We designate these pipelines using the digits 0 to 7. Also, for this explanation each instruction word is 32 bits (4 bytes) long, with a bit, for example, the high order bit S being reserved as a flag for group identification. FIG. 2 therefore shows the general format of all instructions. As shown by FIG. 2, bits 0 to 30 represent the instruction, with the high order bit 31 reserved to flag groups of instructions, i.e., collections of instructions the compiler has determined may be executed in parallel.

Figure 3:
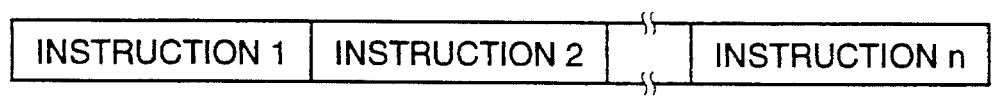
FIG. 3 is a diagram illustrating a group of instruction words.

FIG. 3 illustrates a group of instructions. A group of instructions consists of one to eight instructions (because there are eight pipelines in the preferred implementation) ordered in any arbitrary sequence; each of which can be dispatched to a different parallel pipeline simultaneously.

Figure 4:
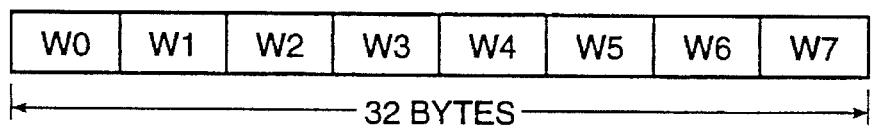
FIG. 4 is a diagram illustrating a frame containing from one to eight groups of instructions.

FIG. 4 illustrates the structure of an instruction frame. In the preferred embodiment an instruction frame is 32 bytes wide and can contain up to eight instruction groups, each comprising from one to eight instructions. This is explained further below.

When the instruction stream is compiled before execution, the compiler places instructions in the same group next to each other in any order within the group and then places that group in the frame. The instruction groups are ordered within the frame from left to right according to their issue sequence. That is, of the groups of instructions in the frame, the first group to issue is placed in the leftmost position, the second group to issue is placed in the next position to the right, etc. Thus, the last group of instructions to issue within that frame will be placed in the rightmost location in the frame. As explained, the group affiliation of all instructions in the same group is indicated by setting the S bit (bit 31 in FIG. 2) to the same value. This value toggles back and forth from 0 to 1 to 0, etc., between adjacent groups to thereby identify the groups. Thus, all instructions in the first group in a frame have the S bit set to 0, all instructions in the second group have the S bit set to 1, all instructions in the third group have the S bit set to 0, etc., for all groups of instructions in the frame.

To clarify the use of a frame, FIG. 5 illustrates three different frame structures for different hypothetical groups of instructions. In FIG. 5a the frame structure for a group of eight instructions, all of which can be issued simultaneously, is shown. The instruction words are designated W0, W1, . . . , W7. The S bit for each one of the instruction words has been set to 0 by the compiler, thereby indicating that all eight instructions can be issued simultaneously.

FIG. 5b illustrates the frame structure for a typical mixture of three intermediate sized groups of instructions. In FIG. 5b these three groups of instructions are designated Group 0, Group 1 and Group 2. Shown at the left-hand side of FIG. 5b is Group 0 that consists of two instruction words W0 and W1. The S bits for each of these instructions has been set to 0. Group 1 of instructions consists of three instruction words, W2, W3 and W4, each having the S bit set to 1. Finally, Group 2 consists of three instruction words, W5, W6 and W7, each having its S bit set to 0.

FIG. 5c illustrates the frame structure for eight minimum sized groups, each consisting of a single instruction. Because each "group" of a single instruction must be issued before the next group, the S bits toggle in a sequence 01010101 as shown.

As briefly mentioned above, in the preferred embodiment the group identifiers are associated with individual instructions in a group during compilation. In the preferred embodiment, this is achieved by compiling the instructions to be executed using a well-known compiler technology. During the compilation, the instructions are checked for data dependencies, dependence upon previous branch instructions, or other conditions that preclude their execution in parallel with other instructions. These steps are performed using a well-known compiler. The result of the compilation is a group identifier being associated with each instruction. It is not necessary that the group identifier be added to the instruction as a tag, as shown in the preferred embodiment and described further below. In an alternative approach, the group identifier is provided as a separate tag that is later associated with the instruction. This makes possible the execution of programs on our system, without need to revise the word width.

In addition, in some embodiments the compiler will determine the appropriate pipeline for execution of an individual instruction. This determination is essentially a determination of the type of instruction provided. For example, load instructions will be sent to the load pipeline, store instructions to the store pipeline, etc. The association of the instruction with the give pipeline can be achieved either by the compiler, or by later examination of the instruction itself, for example during predecoding.

Referring again to FIG. 1, in normal operation the CPU will execute instructions from the instruction cache, according to well-known principles. On an instruction cache miss, however, the entire frame containing the instruction missed is transferred from the main memory into the secondary cache and then into the primary instruction cache, or from the secondary cache to the primary instruction cache, where it occupies one line of the instruction cache memory. Because instructions are only executed out of the instruction cache, all instructions ultimately undergo the following procedure.

At the time a frame is transferred into the instruction cache, the instruction word in that frame is predecoded by the predecoder 30 (FIG. 1), which as is explained below decodes the retrieved instruction into a full 64 bit word. As part of this predecoding the S bit of each instruction is expanded to a full 3 bit field 000, 001, . . . , 111, which provides the explicit binary group number of the instruction. In other words, the predecoder, by expanding the S bit to a three bit sequence explicitly provides information that the instruction group 000 must execute before instruction group 010, although both groups would have all instructions within the group have S bits set to 0. Because of the frame rules for sequencing groups, these group numbers correspond to the order of issue of the groups of instructions. Group 0 (000) will be issued first, Group 1 (001), if present, will be issued second, Group 2 (010) will be issued third. Ultimately, Group 7 (111), if present, will be issued last. At the time of predecoding of each instruction, the S value of the last word in the frame, which belongs to the last group in the frame to issue, is stored in the tag field for that line in the cache, along with the 19 bit real address and a valid bit. The valid bit is a bit that specifies whether the information in that line in the cache is valid. If the bit is not set to "valid," there cannot be a match or "hit" on this address. The S value from the last instruction, which S value is stored in the tag field of the line in the cache, provides a "countdown" value that can be used to know when to increment to the next cache line.

As another part of the predecoding process, a new 4 bit field prefix is added to each instruction giving the explicit pipe number of the pipeline to which that instruction will be routed. The use of four bits, rather than three allows the system to be later expanded with additional pipelines. Thus, at the time an instruction is supplied from the predecoder to the instruction cache, each instruction will have the format shown in FIG. 6. As shown by FIG. 6, bits 0 to 56 provide 57 bits for the instruction, bits 57, 58 and 59 form the full 3 bit S field, and bits 60–63 provide the 4 bit P field.

Figure 7:
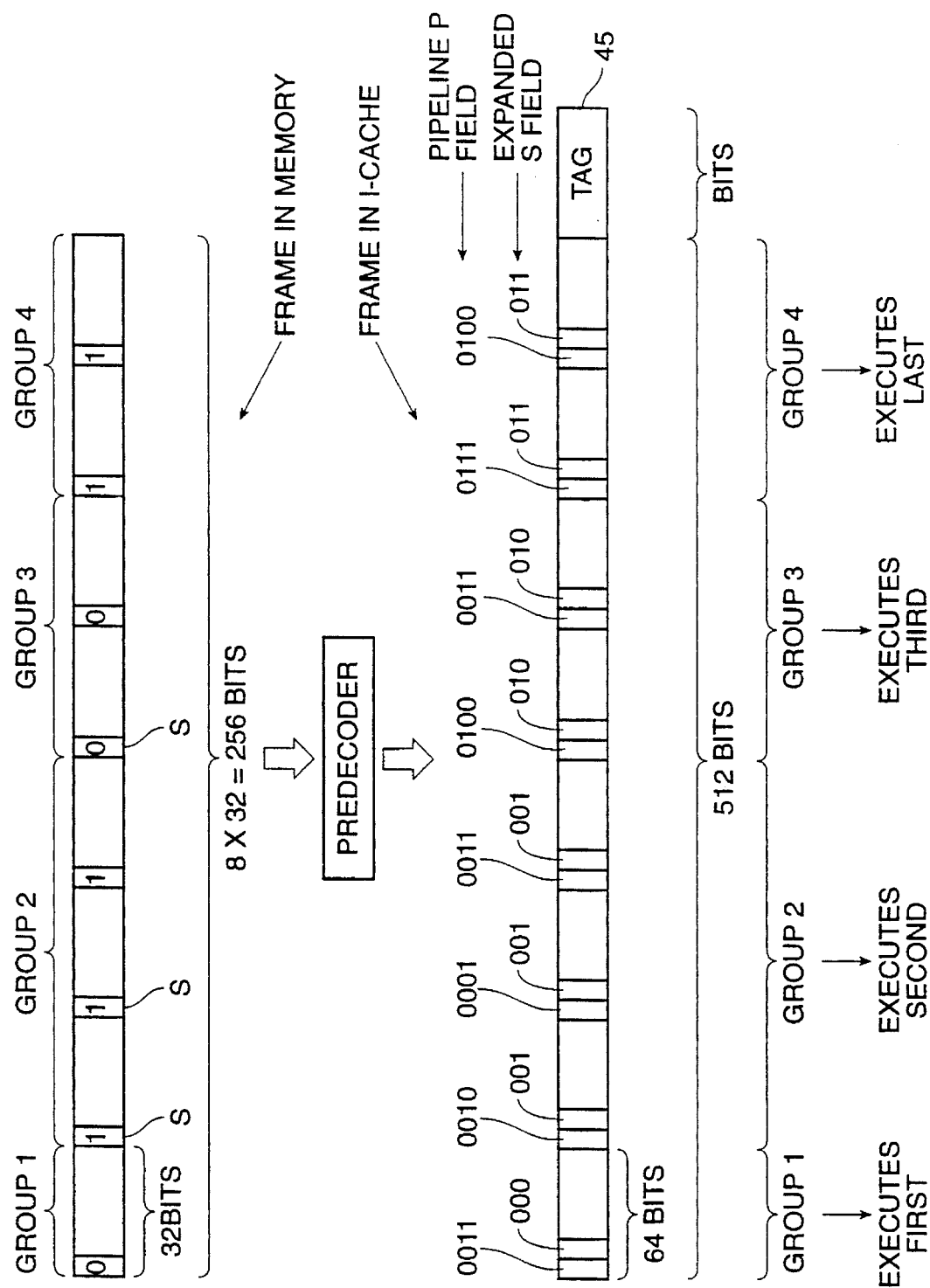
FIG. 7 illustrates the operation of the predecoder.

FIG. 7 illustrates the operation of the predecoder in transferring a frame from memory to the instruction cache. In the upper portion of FIG. 7, the frame is shown with a hypothetical four groups of instructions. The first group consists of a single instruction, the second group of three instructions, and each of the third and fourth groups of two instructions. As described, instruction is 32 bits in length and include an S bit to separate the groups. The predecoder decodes the instruction shown in the upper portion of FIG. 7 into the instruction shown in the lower portion of FIG. 7. As shown, the instructions are expanded to 64 bit length, with each instruction including a 4 bit identification of the pipeline to which the instruction is to be assigned, and the expanded group field to designate the groups of instructions that can be executed together. For illustration, hypothetical pipeline tags have been applied. Additionally, the predecoder examines each frame for the minimum number of clocks required to execute the frame, and that number is appended to the address tag 45 for the line. The address tag consists of bits provided for the real address for the line, 1 bit to designate the validity of the frame, and 3 bits to specify the minimum time in number of clock cycles, for that frame to issue. The number of clocks for the frame to issue is determined by the group identification number of the last word in the frame. At this stage, the entire frame shown in the lower portion of FIG. 7 is present in the instruction cache.

It may be desirable to implement the system of this invention on computer systems that already are in existence and therefore have instruction structures that have already been defined without fields for the group information, pipeline information, or both. In this case in another embodiment of this invention the group and pipeline information is supplied on a different clock cycle, then combined with the instructions in the cache. Such an approach can be achieved by adding a "no-op" instruction with fields that identify which instructions are in which group, and identify the pipeline for execution of the instruction, or by supplying the information relating to the parallel instructions in another manner. It therefore should be appreciated that the manner in which the data arrives at the crossbar to be processed is somewhat arbitrary. We use the word "associated" herein to designate the concept that the pipeline and group identifiers are not required to have a fixed relationship to the instruction words. That is, the pipeline and group identifiers need not be imbedded within the instructions themselves as shown in FIG. 7. Instead they may arrive from another means, or on a different cycle.

Figure 8:
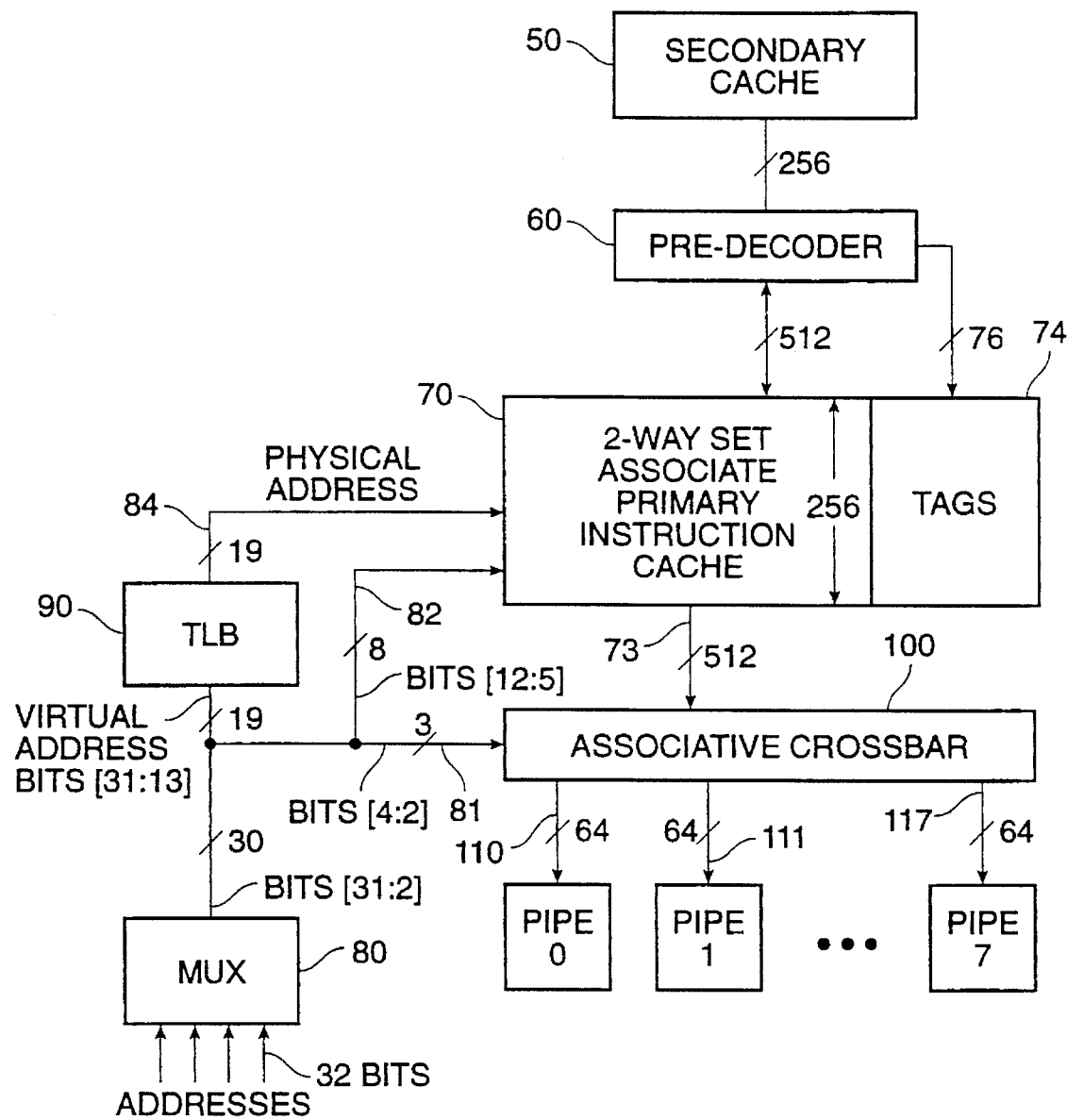
FIG. 8 is a diagram illustrating the overall structure of the instruction cache.
Figure 9:
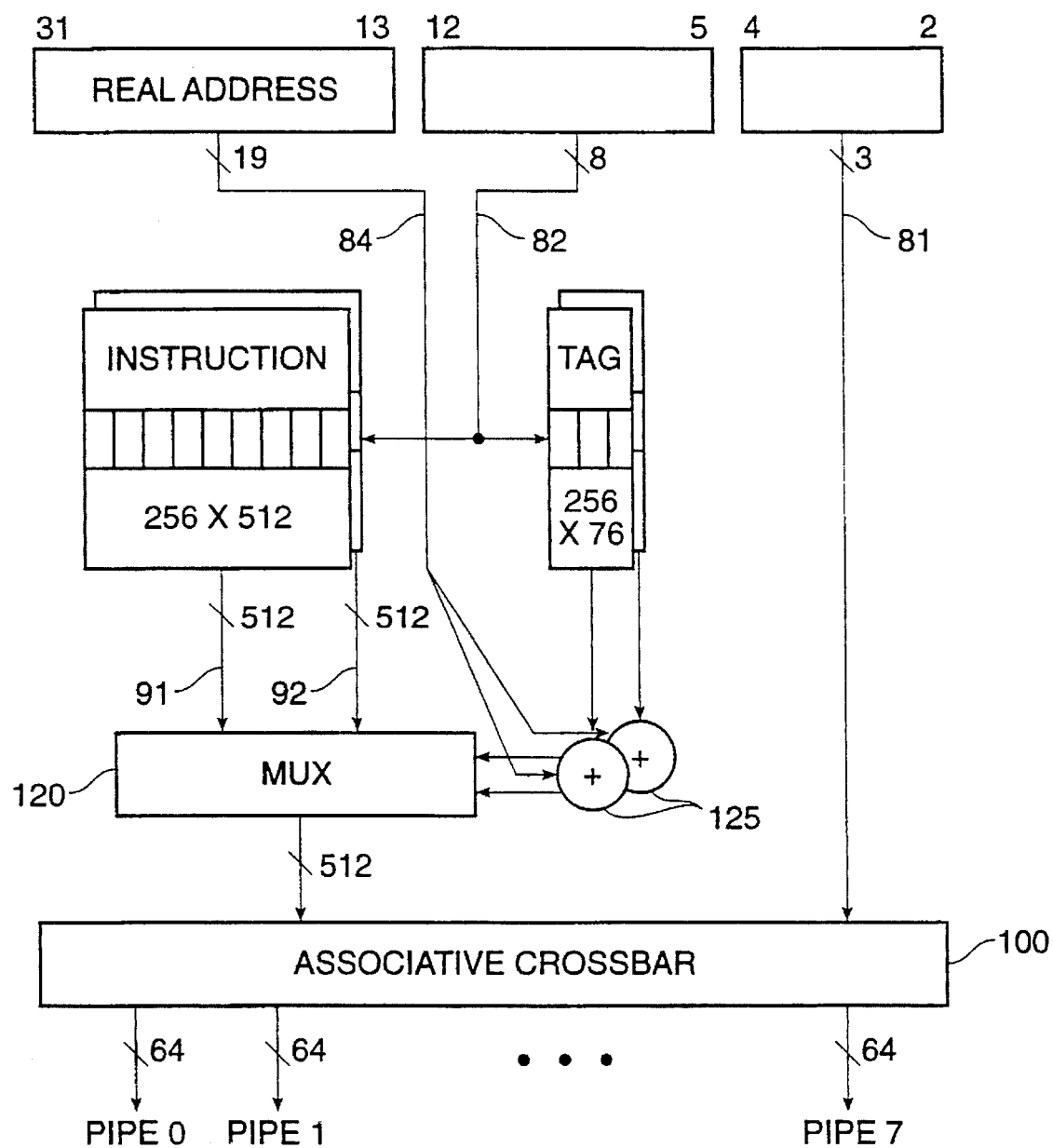
FIG. 9 is a diagram illustrating the manner in which frames are selected from the instruction cache.
Figure 10:
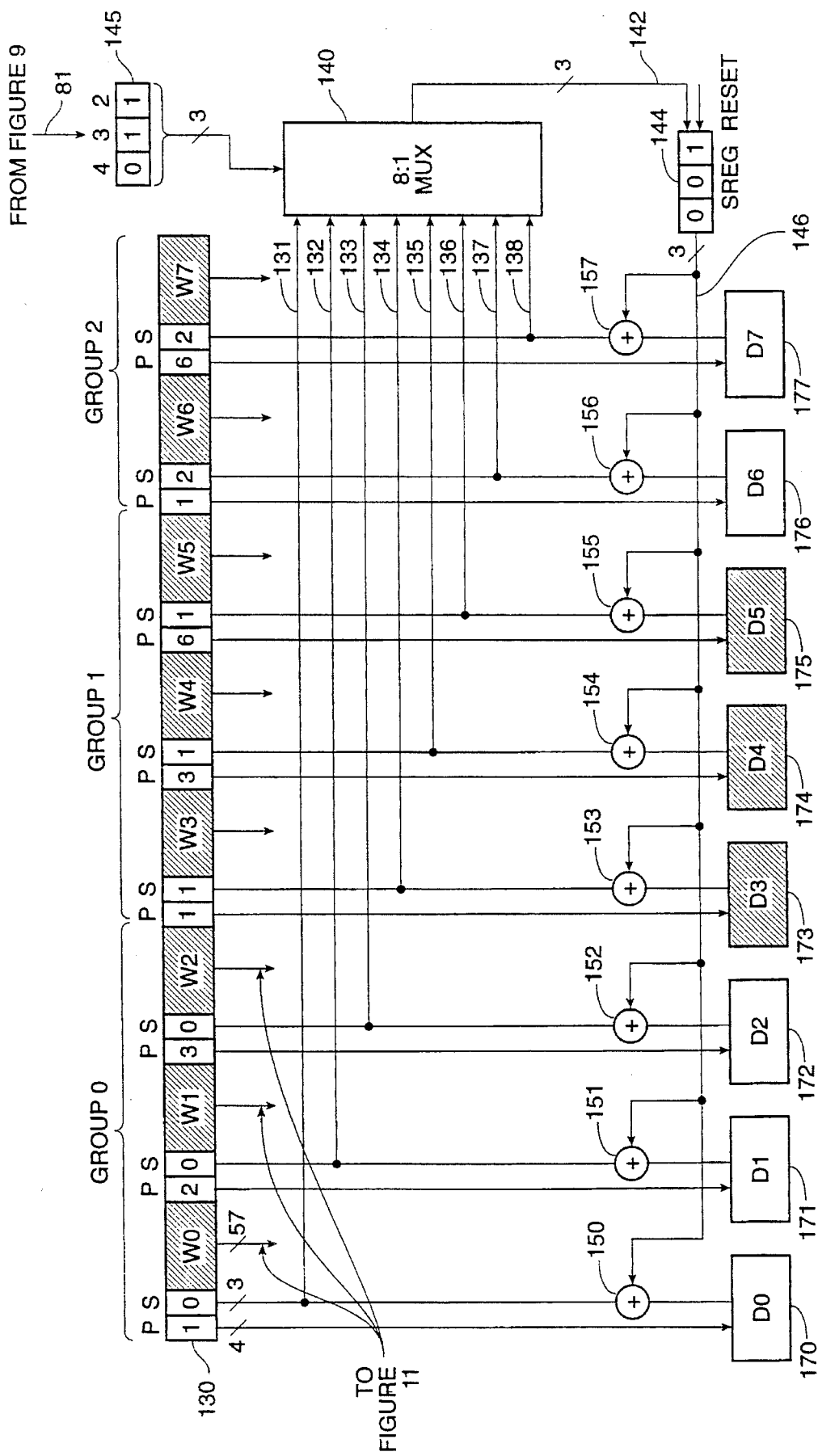
FIG. 10 is a diagram illustrating the group selection function in the associative crossbar.
Figure 11:
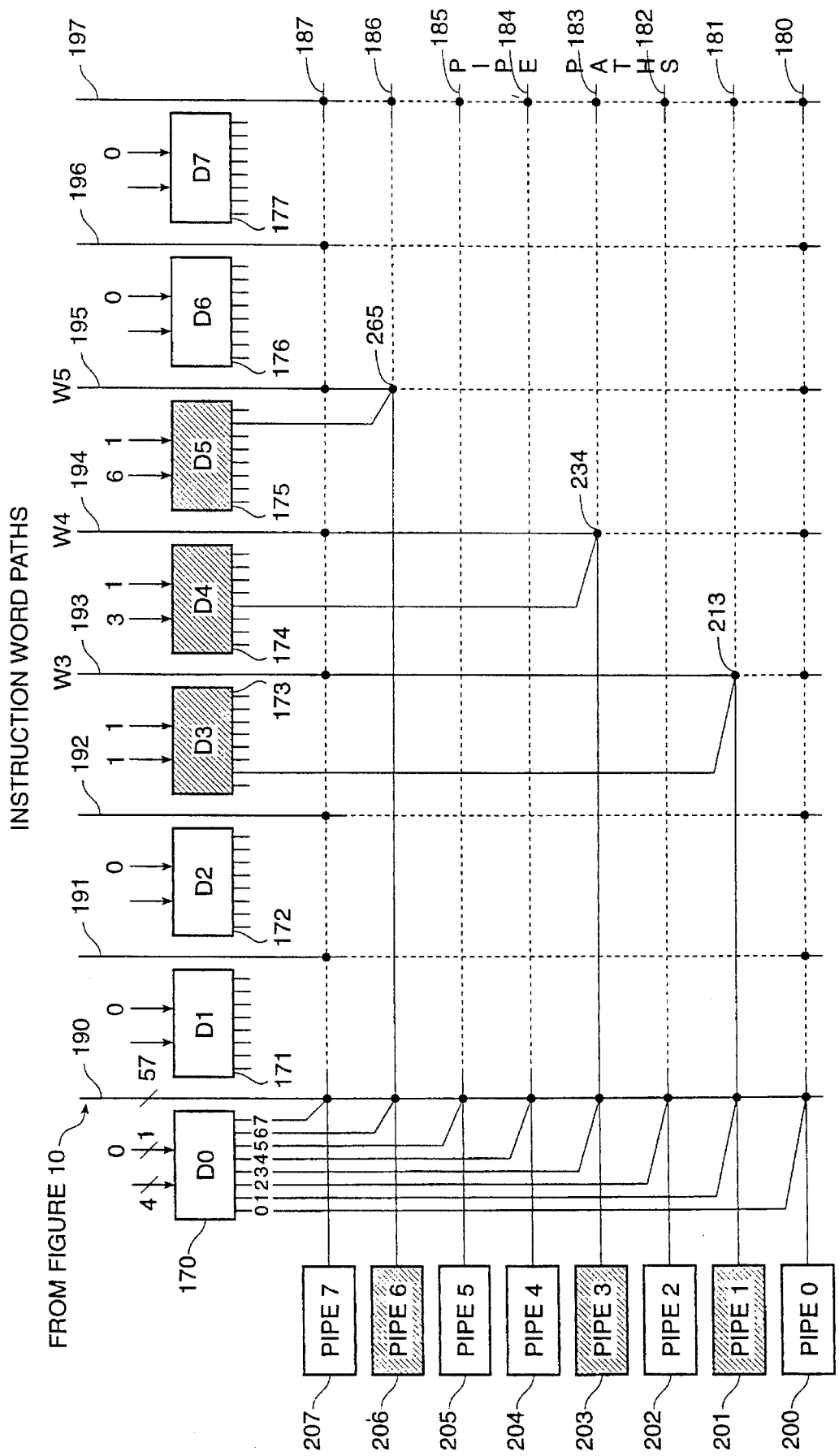
FIG. 11 is a diagram illustrating the group dispatch function in the associative crossbar.

FIG. 8 is a simplified diagram illustrating the secondary cache, the predecoder, and the instruction cache. This drawing, as well as FIGS. 9, 10 and 11, are used to explain the manner in which the instructions tagged with the P and S fields are routed to their designated instruction pipelines.

In FIG. 8 instruction frames are fetched in a single transfer across a 256 bit (32 byte) wide path from a secondary cache 50 into the predecoder 60. As explained above, the predecoder expands each 32 bit instruction in the frame to its full 64 bit wide form and prefixes the P and S fields. After predecoding the 512 bit wide instruction is transferred into the primary instruction cache 70. At the same time, tag is placed into the tag field 74 for that line.

The instruction cache operates as a conventional physically-addressed instruction cache. In the example depicted in FIG. 8, the instruction cache will contain 512 bit fully-expanded instruction frames of eight instructions each organized in two compartments of 256 lines.

Address sources for the instruction cache arrive at a multiplexer 80 that selects the next address to be fetched. Because instructions are always machine words, the low order two address bits <1:0> of the 32 bit address field supplied to multiplexer 80 are discarded. These two bits designate byte and half-word boundaries. Of the remaining 30 bits, the next three low order address bits <4:2>, which designate a particular instruction word in a frame, are sent directly via bus 81 to the associative crossbar (explained in conjunction with subsequent figures). The next low eight address bits <12:5> are supplied over bus 82 to the instruction cache 70 where they are used to select one of the 256 lines in the instruction cache. Finally, the remaining 19 bits of the virtual address <31:13> are sent to the translation lookaside buffer (TLB) 90. The TLB translates these bits into the high 19 bits of the physical address. The TLB then supplies them over bus 84 to the instruction cache. In the cache they are compared with the tag of the selected line, to determine if there is a "hit" or a "miss" in the instruction cache.

If there is a hit in the instruction cache, indicating that the addressed instruction is present in the cache, then the selected frame containing the addressed instruction is transferred across the 512 bit wide bus 73 into the associative crossbar 100. The associative crossbar 100 then dispatches the addressed instruction, with the other instructions in its group, if any, to the appropriate pipelines over buses 110, 111, . . . , 117. Preferably the bit lines from the memory cells containing the bits of the instruction are themselves coupled to the associative crossbar. This eliminates the need for numerous sense amplifiers, and allows the crossbar to operate on the lower voltage swing information from the cache line directly, without the normally intervening driver circuitry to slow system operation.

FIG. 9 is a block diagram illustrating in more detail the frame selection process. As shown, bits <4:2> of the virtual address are supplied directly to the associative crossbar 100 over bus 81. Bus 81, as explained above will preferably include a pair of conductors, the bit lines, for each data bit in the field. Bits <12:5> supplied over bus 82 are used to select a line in the instruction cache. The remaining 19 bits, translated into the 19 high order bits <31:13> of physical address, are used to compare against the tags of the two selected lines (one from each compartment of the cache) to determine if there is a hit in either compartment. If there is a hit, the two 512 bit wide frames are supplied to multiplexer 120. The choice of which line is ultimately supplied to associative crossbar 100 depends upon the real address bits <31:13> that are compared by comparators 125. The output from comparators 125 thus selects the appropriate frame for transfer to the crossbar 100.

FIG. 10 illustrates in more detail the group select function of the associative crossbar. A 512 bit wide register 130, preferably formed by the SRAM cells in the instruction cache contains the frame of the instructions to be issued. For the purposes of illustration, register 130 is shown as containing a frame having three groups of instructions, with Group 0 including words W0, W1 and W2; Group 1 containing words W3, W4 and W5; and Group 2 containing words W6 and W7. For illustration, the instructions in Group 0 are to be dispatched to pipelines 1, 2 and 3; the instructions in Group 1 to pipelines 1, 3 and 6; and the instructions in Group 2 to pipelines 1 and 6. The three S bits (group identification field) of each instruction in the frame are brought out to an 8:1 multiplexer 140 over buses 131, 132, 133, . . . , 138. The S field of the next group of instructions to be executed is present in a 3 bit register 145. As shown in FIG. 10, the hypothetical contents of register 145 are 011. These bits have been loaded into register 145 using bus 81 described in conjunction with FIG. 9. Multiplexer 140 then compares the value in this register against the contents of the S field in each of the instruction words. If the two values match, the appropriate decoder 150 is enabled, permitting the instruction word to be processed on that clock cycle. If the values do not match, the decoder is disabled and the instruction words are not processed on that clock cycle. In the example depicted in FIG. 10, the contents of register 145 match the S field of the Group 1 instructions. The resulting output, supplied over bus 142, is communicated to S register 144 and then to the decoders via bus 146. The S register contents enable decoders 153, 154 and 155, all of which are in Group 001. As will be shown in FIG. 11, this will enable these instructions W3, W4 and W5 to be sent to the pipelines for processing.

FIG. 11 is a block diagram illustrating the group dispatching of the instructions in the group to be executed. The same registers are shown across the upper portion of FIG. 11 as in the lower portion of FIG. 10. As shown in FIG. 11, the crossbar switch itself consists of two sets of crossing pathways. In the horizontal direction are the pipeline pathways 180, 181, . . . , 187. In the vertical direction are the instruction word paths, 190, 191, . . . , 197. Each of these pipeline and instruction pathways is themselves a bus for transferring the instruction word. Each horizontal pipeline pathway is coupled to a pipeline execution unit 200, 201, 202, . . . , 207. Each of the vertical instruction word pathways 190, 191, . . . , 197 is coupled to an appropriate portion of register 130 (FIG. 10).

The decoders 170, 171, . . . , 177 associated with each instruction word pathway receive the 4 bit pipeline code from the instruction. Each decoder, for example decoder 170, provides as output eight 1 bit control lines. One of these control lines is associated with each pipeline pathway crossing of that instruction word pathway. Selection of a decoder as described with reference to FIG. 10 activates the output bit control line corresponding to that input pipe number. This signals the crossbar to close the switch between the word path associated with that decoder and the pipe path selected by that bit line. Establishing the cross connection between these two pathways causes a selected instruction word to flow into the selected pipeline. For example, decoder 173 has received the pipeline bits for word W3. Word W3 has associated with it pipeline path 1. The pipeline path 1 bits are decoded to activate switch 213 to supply instruction word W3 to pipeline execution unit 201 over pipeline path 181. In a similar manner, the identification of pipeline path 3 for decoder D4 activates switch 234 to supply instruction word W4 to pipeline path 3. Finally, the identification of pipeline 6 for word W5 in decoder D5 activates switch 265 to transfer instruction word W5 to pipeline execution unit 206 over pipeline pathway 186. Thus, instructions W3, W4 and W5 are executed by pipes 201, 203 and 206, respectively.

The pipeline processing units 200, 201, . . . , 207 shown in FIG. 11 can carry out desired operations. In a preferred embodiment of the invention, each of the eight pipelines first includes a sense amplifier to detect the state of the signals on the bit lines. In one embodiment the pipelines include first and second arithmetic logic units; first and second floating point units; first and second load units; a store unit and a control unit. The particular pipeline to which a given instruction word is dispatched will depend upon hardware constraints as well as data dependencies.

Figures 12, 13:
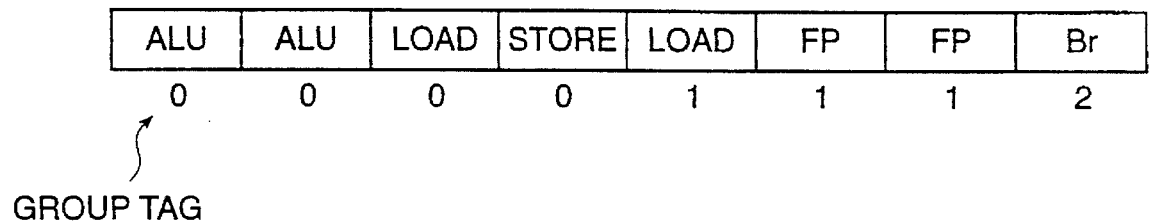
FIG. 12 is a diagram illustrating a hypothetical frame of instructions.
FIG. 13 is a diagram illustrating the manner in which the groups of instructions in FIG. 12 are issued on different clock cycles.

FIG. 12 is an example of a frame and how it will be executed by the pipeline processors 200–207 of FIG. 11. As shown in FIG. 12 the frame includes three groups of instructions. The first group, with group identification number 0, includes two instructions that can be executed by the arithmetic logic unit, a load instruction and a store instruction. Because all these instructions have been assigned the same group identification number by the compiler, all four instructions can execute in parallel. The second group of instructions consists of a single load instruction and two floating point instructions. Again, because each of these instructions has been assigned "Group 1," all three instructions can be executed in parallel. Finally, the last instruction word in the frame is a branch instruction that, based upon the compiler's decision, must be executed last.

FIG. 13 illustrates the execution of the instructions in the frame shown in FIG. 12. As shown, during the first clock the Group 0 instructions execute, during the second clock the load and floating point instructions execute, and during the third clock the branch instruction executes. To prevent groups from being split across two instruction frames, an instruction frame may be only partially filled, where the last group is too large to fit entirely within the remaining space of the frame.

Figure 14:
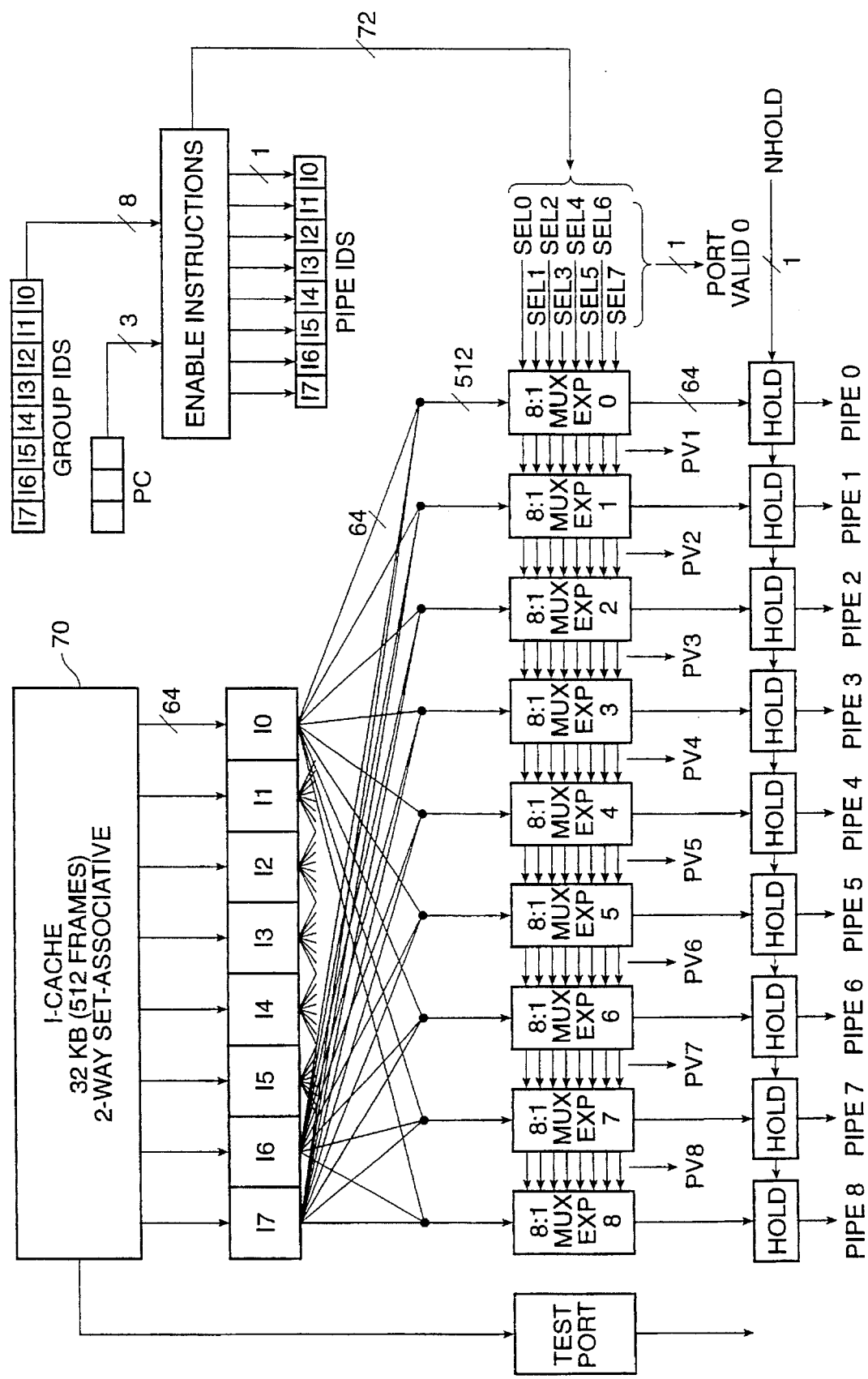
FIG. 14 is a diagram illustrating another embodiment of the associative crossbar.

FIG. 14 is a diagram illustrating another embodiment of the associative crossbar. In FIG. 14 nine pipelines 0–8 are shown coupled to the crossbar. The three bit program counter PC points to one of the instructions in the frame, in combination with the set of 8 group identification bits for the frame, indicating the group affiliation of each instruction, are used to enable a subset of the instructions in the frame. The enabled instructions are those at or above the address indicated by the PC that belong to the current group.

The execution ports that connect to the pipelines specified by the pipeline identification bits of the enabled instructions are then selected to multiplex out the appropriate instructions from the current frame. If one or more of the pipelines is not ready to receive a new instruction, a set of hold latches at the output of the execution ports prevents any of the enabled instructions from issuing until the "busy" pipeline is free. Otherwise the instructions pass transparently through the hold latches into their respective pipelines. Accompanying the output of each port is a "port valid" signal that indicates whether the port has valid information to issue to the hold latch.

Figure 15:
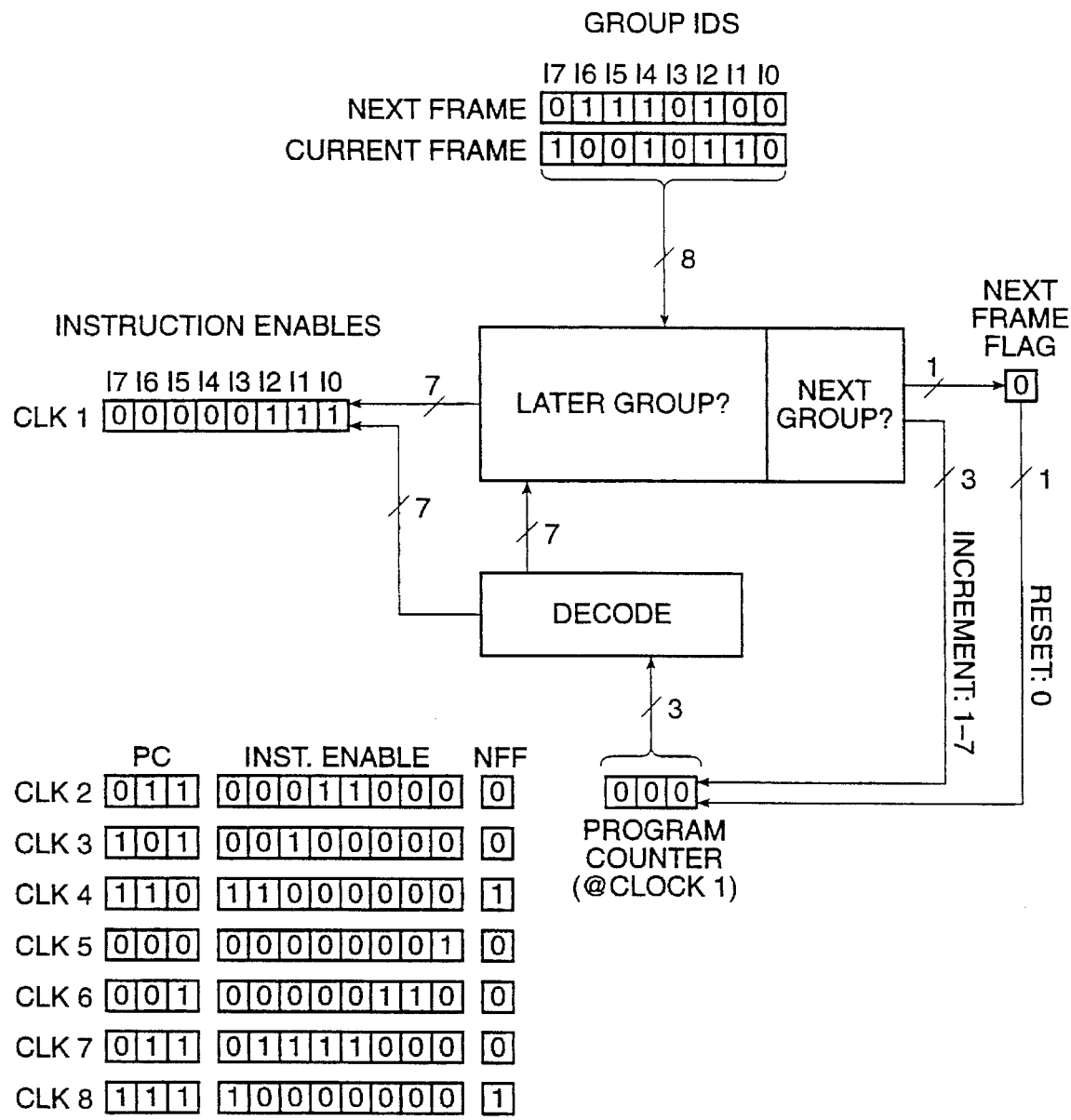
FIG. 15 is a diagram illustrating the group select function in further detail.

FIG. 15 is a diagram illustrating the group select function in further detail. This figure illustrates the mechanism used to enable an addressed group of instructions within a frame. The program counter is first decoded into a set of 14 bit signals. Seven of these signals are combined with the eight group identifiers of the current frame to determine whether each of the seven instructions, 11 to 17, is or is not the start of a later group. This information can then be combined with the other 7 bit signals from the PC decoder to determine which of the eight instructions in the frame should be enabled. Using the pipeline identifying field each enabled instruction can be combined with the other 7 bit signal to determine which of the eight instructions in the frame should be enabled. Each such enabled instruction can then signal the execution port, as determined by the pipeline identifier, to multiplex out the enabled instruction. Thus if I2 is enabled, and the pipeline code is 5, the select line from I2 to port 5 is activated, causing I2 to flow to the hold latch at pipe 5.

Because the instructions that start later groups are known, the system can decide easily which instruction starts the next group. This information is used to update the PC to the address of the next group of instructions. If no instruction in the frame begins the next group, i.e., the last instruction group has been dispatched to the pipelines, a flag is set. The flag causes the next frame of instructions to be brought into the crossbar. The PC is then reset to I0. Shown in the figure is an exemplary sequence of the values that the PC, the instruction enable bits and the next frame flag take on over a sequence of eight clocks extending over two frames.

The processor architecture described above provides many unique advantages to a system using this invention. The system described is extremely flexible, enabling instructions to be executed sequentially or in parallel, depending entirely upon the "intelligence" of the compiler. As compiler technology improves, the described hardware can execute programs more rapidly, not being limited to any particular frame width, number of instructions capable of parallel execution, or other external constraints. Importantly, the associative crossbar aspect of this invention relies upon the content of the message being decoded, not upon an external control circuit acting independently of the instructions being executed. In essence, the associative crossbar is self directed. In the preferred embodiment the system is capable of a parallel issue of up to eight operations per cycle. For a more complete description of the associative crossbar, see copending U.S. application Ser. No. 08/147,797, filed Nov. 5, 1993, and entitled "Instruction Cache Associative Crossbar Switch."

Although the foregoing has been a description of the preferred embodiment of the invention, it will be apparent to those of skill in the art that numerous modifications and variations may be made to the invention without departing from the scope as described herein. For example, arbitrary numbers of pipelines, arbitrary numbers of decoders, and different architectures may be employed, yet rely upon the system we have developed.

We claim:

1. A computing system having a plurality of processing pipelines for executing groups of individual instructions, within very long instruction words, each individual instruction to be executed in each group being executed by different processing pipelines in parallel, the computing system comprising:

a main memory for storing a very long instruction word;

a very long instruction word storage, coupled to the main memory, for receiving the very long instruction word from the main memory, and for holding the very long instruction word, the very long instruction word including a predetermined number N of individual instructions, and including at least one group of M individual instructions to be executed in parallel, where M≦N, each individual instruction in the very long instruction word storage to be executed having a pipeline identifier indicative of a processing pipeline for executing the individual instruction, and having a group identifier indicative of a group of individual instructions to which the individual instruction is assigned for execution in parallel;

group decoder means responsive to the group identifier for each individual instruction in the very long instruction word storage to be executed for enabling each individual instruction in the very long instruction word storage having a similar group identifier, to be executed in parallel by the plurality of processing pipelines; and pipeline decoder means responsive to the pipeline identifier of each individual instructions in the very long instruction word storage to be executed for causing each individual instruction in a group of individual instructions having the similar group identifier to be supplied to the different processing pipelines.

2. The computing system in claim 1, wherein the very long instruction word storage includes the at least one group of M individual instructions, and also includes group identifiers and pipeline identifiers for each individual instruction in the at least one group of M individual instructions.

3. The computing system in claim 2, wherein each individual instruction in the at least one group of M individual instructions has associated therewith a different pipeline identifier.

4. The computing system of claim 1, wherein the very long instruction word storage holds a first group of individual instructions to be executed in parallel and a second group of individual instructions to be executed in parallel after the first group, each individual instruction in the first group having associated therewith a first group identifier different from a second group identifier associated with each individual instruction in the second group, the first group and the second group being placed adjacent to each other in the very long instruction word storage.

5. The computing system of claim 4 wherein:

the very long instruction word storage comprises a line in a cache memory having a fixed number of storage locations; and the first group of individual instructions is placed at one end of the line in the cache memory, and the second group of individual instructions is placed next to the first group of individual instructions.

6. A method of executing in a plurality of processing pipelines arbitrary numbers of instructions in a stream of instructions in parallel which have been compiled to determine which instructions can be executed in parallel, the method comprising:

in response to the compilation, assigning a common group identifier to a group of instructions which can be executed in parallel;

determining a processing pipeline for execution of each instruction in the group of instructions to be executed;

assigning a pipeline identifier to each instruction in the group;

embedding the common group identifier and the pipeline identifier into the group of instructions;

forming a very long instruction word with a fixed number of the instructions including at least the group of instructions having the common group identifier as well as at least one other instruction having a different group identifier; and storing the very long instruction word in a main memory.

7. A method as in claim 6 further comprising the step of:

placing the very long instruction word retrieved from the main memory into a very long instruction word register; and executing the group of instructions in the plurality of processing pipelines in parallel.

8. A method as in claim 7, wherein the very long instruction word register holds at least two groups of instructions; and wherein the step of placing the instructions in the very long instruction word register comprises placing the group of instructions adjacent to the at least one other instruction having the different group identifier in the very long instruction word register.

9. A method as in claim 8 wherein the step of executing the group of instructions in parallel comprises:

coupling the very long instruction word register to a detection means to receive group identifiers of each instruction to be executed in the very long instruction word; and supplying only instructions having the common group identifier to the processing pipelines.

10. In a computing system having a plurality of processing pipelines in which groups of individual instructions, within very long instruction words, are executable in parallel by processing pipelines, a method for supplying each individual instruction in a group to be executed in parallel to corresponding appropriate processing pipelines, the method comprising:

retrieving a very long instruction word from a main memory;

storing in a very long instruction word storage the very long instruction word, the very long instruction word including groups of individual instructions to be executed in parallel, each individual instruction to be executed in the very long instruction word having embedded therein a pipeline identifier indicative of the corresponding appropriate processing pipeline which will execute that instruction and a group identifier indicative of the group identification;

comparing the group identifier of each individual instruction in the very long instruction word to an execution group identifier to identify an execution group; and using the pipeline identifier of individual instructions in the execution group to execute each individual instruction in the execution group in the corresponding appropriate processing pipelines.

11. In a computing system having a plurality of processing pipelines in which groups of individual instructions, from a very long instruction word, are executable in parallel by the plurality of processing pipelines, an apparatus for routing each individual instruction in a particular group to be executed in parallel to an appropriate processing pipeline, the apparatus comprising:

a main memory for storing the very long instruction word;

a very long instruction word storage coupled to the main memory, for receiving the very long instruction word from the main memory and for holding the very long instruction word, the very long instruction word including groups of individual instructions, each individual instruction to be executed in the very long instruction word storage having associated therewith a pipeline identifier indicative of a processing pipeline for executing that individual instruction and also having associated therewith a group identifier to designate a group of individual instructions to which that individual instruction is assigned, the pipeline identifier and the group identifier embedded in the very long instruction word;

a crossbar switch having a first set of connectors coupled to the very long instruction word storage and a second set of connectors coupled to the plurality of processing pipelines;

a router coupled to the very long instruction word storage and the crossbar switch, responsive to a pipeline identifier for each individual instruction to be executed in the group for routing each individual instruction in the group from connectors of the first set Of connectors onto appropriate connectors of the second set of connectors, to thereby supply each individual instruction in the group to be executed in parallel to the appropriate processing pipeline.

12. The apparatus of claim 11, wherein the first set of connectors includes a set of first communication buses, one first communication bus for each individual instruction to be executed in the very long instruction word storage;

wherein the second set of connectors includes a set of second communication buses, one second communication bus for each processing pipeline; and wherein the router comprises:

a set of decoders coupled to the very long instruction word storage, each decoder for receiving as input signals the pipeline identifier of each individual instruction in the very long instruction word storage and in response thereto for supplying as output signals switch control signals corresponding to each individual instruction in the very long instruction word storage; and a set of switches coupled to the set of decoders and to the crossbar switch, one switch of the set of switches at each intersection of each of the first set of communication buses with each of the second set of communication buses, each switch for receiving the switch control signals and for providing connections in response to receiving a corresponding switch control signal to thereby supply each individual instruction in the group to be executed in parallel to the appropriate processing pipeline.

13. The apparatus of claim 12 further comprising:

detection means coupled to the very long instruction word storage, for receiving the group identifier of each individual instruction in the very long instruction word storage to be executed and in response thereto supply a group control signal; and wherein the set of decoders are also coupled to the detection means for receiving the group control signal and in response thereto supply the switch control signal for only those individual instructions in the group to be supplied to the plurality of processing pipelines.

14. The apparatus of claim 13, wherein the detection means comprises a multiplexer coupled to receive group identifiers of each individual instruction in the very long instruction word storage and a group identifier for a group of individual instructions to be next executed, and in response thereto allow the group of individual instructions to be supplied to the plurality of processing pipelines.

15. Apparatus as in claim 14 wherein the multiplexer supplies output signals to the set of decoders to indicate a group identifier of a group of individual instructions to be next supplied to the plurality of processing pipelines.

16. In a computing system having a plurality of processing pipelines in which groups of individual instructions, within a very long instruction word, are executable by the plurality of processing pipelines, each individual instruction in the very long instruction word to be executed having embedded therein a group identifier and a pipeline identifier, an apparatus for routing each individual instruction of a group of individual instructions to be executed in parallel to an appropriate processing pipeline of the plurality of processing pipelines, the apparatus comprising:

a main memory for storing the very long instruction word;

a very long instruction word storage coupled to the main memory, for receiving the very long instruction word from the main memory and for holding the very long instruction word the very long instruction word including groups of instructions to be executed in parallel, including pipeline identifiers and group identifiers;

selection means coupled to the very long instruction word storage for receiving the group identifier for each individual instruction in the very long instruction word, for determining in response thereto a group of individual instructions to be executed in parallel, and for outputting a control signal;

decoder means coupled to the selection means and to the very long instruction word storage, for receiving the control signal and the pipeline identifier for each individual instructions in the very long instruction word, for determining in response thereto the appropriate processing pipeline for each individual instruction of the group, and for outputting switch control signals;

a crossbar switch coupled to the decoder means, having a first set of connectors coupled to the very long instruction word storage for receiving the very long instruction word therefrom and a second set of connectors coupled to the plurality of processing pipelines, for coupling each individual instruction of the group to an appropriate processing pipeline in response to the Switch control signals.

17. The apparatus of claim 16, wherein the first set of connectors comprises a set of first communication buses, one first communication bus for each individual instruction held in the very long instruction word storage;

wherein the second set of connectors comprises a set of second communication buses, one second communication bus for each processing pipeline;

wherein the decoder means comprises a set of decoders coupled to receive as first input signals the pipeline identifiers for each individual instruction in the group and as second input signals the pipeline identifiers for remaining individual instructions in the very long instruction word; and wherein the crossbar switch comprises a set of switches, one switch for every intersection between each of the first set of connectors and each of the second set of connectors, each switch for providing connections, in response to receiving the switch control signals, between each individual instruction in the group to be executed in parallel to the appropriate processing pipeline.

18. The apparatus of claim 17, wherein the selection means comprises a multiplexer coupled to receive the group identifiers for each individual instruction in the very long instruction word storage, and in response to the group identifiers, enable the decoder means to output switch control signals for each individual instructions of the group.

19. The apparatus of claim 18, wherein the multiplexer supplies a switch control signal to the decoder means to enable the decoder means to output switch control signals for each individual instruction of the group of individual instructions from the very long instruction word.

20. In a computing system having a plurality of processing pipelines in which groups of individual instructions are executable, each individual instruction in a group executable in parallel by the plurality of processing pipelines, a method for transferring each individual instruction in a group to be executed through a crossbar switch having a first set of connectors coupled to a very long instruction word storage for receiving individual instructions therefrom, a second set of connectors coupled to the plurality of processing pipelines, and switches between the first set and the second set. Of connectors, the method comprising:

retrieving the very long instruction word from a main memory;

storing in the very long instruction word storage, the very long instruction word, the very long instruction word having a set of individual instructions including at least one group of individual instructions to be executed in parallel, each individual instruction in the at least one group having embedded therein a unique pipeline identifier indicative of the processing pipeline which will execute that individual instruction, the very long instruction word storage also including at least one other individual instruction not in the at least one group of individual instructions, the at least one other individual instruction having embedded therein a different pipeline identifier; and using the unique pipeline identifiers of the individual instructions in the at least one group of individual instructions to control the switches between the first set of connectors and the second set of connectors to thereby supply each individual instruction in the at least one group to be executed in parallel to an appropriate processing pipeline.

21. A method as in claim 20 wherein the step of using the pipeline identifiers comprises:

supplying the unique pipeline identifiers of each individual instructions in the at least one group of individual instructions to individual decoders of a set of decoders, each decoder of which provides an output signal indicative of the Unique pipeline identifiers of the individual instruction supplied thereto; and using the output signals of the sets of decoders to control the switches between the first set of connectors and the second set of connectors to thereby supply each individual instruction in the at least one group to be executed in parallel to an appropriate processing pipeline.

22. A method as in claim 21 wherein each individual instruction in the storage further includes a group identifier embedded therein to designate among the instructions present in the very long instruction word storage, which of the individual instructions may be simultaneously supplied to the plurality of processing pipelines, and the method further comprises:

supplying a group identifier for a group of instructions to be executed by the processing pipelines together with the group identifiers of the individual instructions in the at least one group of individual instructions to a selector;

comparing the group identifier of the group of instructions to be executed by the processing pipelines with the group identifiers of the individual instructions in the at least one group of instructions, to provide output comparison signals; and using both the output comparison signals and the output signals to control the switches between the first set of connectors and the second set of connectors to thereby supply each instruction in the at least one group to be executed in parallel to the appropriate processing pipeline.

23. In a computing system having a plurality of processing pipelines in which groups of individual instructions are executable by the plurality of processing pipelines, a method for supplying each individual instruction in a group of individual instructions to be executed in parallel to an appropriate processing pipeline, the method comprising:

retrieving a very long instruction word from a main memory;

storing in a very long instruction word storage the very long instruction word retrieved from the main memory, the very long instruction word including groups of individual instructions to be executed in parallel, each individual instruction in a group of individual instructions having embedded therein a pipeline identifier indicative of a processing pipeline which will execute that individual instruction and having embedded therein a group identifier indicative of a group identification;

comparing a group identifier for each individual instruction in the very long instruction word with an execution group identifier of those instructions to be next executed in parallel; and using a pipeline identifier for those instructions to be next executed in parallel to control switches in a crossbar switch having a first set of connectors coupled to the very long instruction word storage for receiving the very long instruction word therefrom and a second set of connectors coupled to the plurality of processing pipelines to thereby supply each individual instruction in the at least one group to be executed in parallel to the appropriate processing pipeline.

* * * * *

UNITED STATES PATENT AND TRADEMARK OFFICE
CERTIFICATE OF CORRECTION

PATENT NO. : 5,560,028
DATED : Sept. 24, 1996
INVENTOR(S) : Howard G. Sachs

It is certified that error appears in the above-indentified patent and that said Letters Patent is hereby corrected as shown below:

On title page, item [54], and in col. 1, line 1:

In the title, please delete "SUPERSCALAR" and insert --SUPERSCALER--.

Signed and Sealed this

Thirty-first Day of December, 1996

*Attest:*

BRUCE LEHMAN

*Attesting Officer*  Commissioner of Patents and Trademarks

(12) EX PARTE REEXAMINATION CERTIFICATE (6372nd)
United States Patent
Sachs et al.

(10) Number: US 5,560,028 C1
(45) Certificate Issued: Aug. 19, 2008

(54) SOFTWARE SCHEDULED SUPERSCALER COMPUTER ARCHITECTURE

(75) Inventors: Howard G. Sachs, Belvedere, CA (US); Siamak Arya, Palo Alto, CA (US)

(73) Assignee: Intergraph Corporation, Huntsville, AL (US)

Reexamination Request:
No. 90/008,504, Apr. 20, 2007

Reexamination Certificate for:
Patent No.: 5,560,028
Issued: Sep. 24, 1996
Appl. No.: 08/422,753
Filed: Apr. 13, 1995

Certificate of Correction issued Dec. 31, 1996.

Related U.S. Application Data

(63) Continuation of application No. 08/147,800, filed on Nov. 5, 1993, now abandoned.

(51) Int. Cl.
*G06F 9/38* (2006.01)

(52) U.S. Cl. .................. 712/23; 712/24; 712/E9.049; 712/E9.054; 712/E9.055; 712/E9.071

(58) Field of Classification Search .......... None
See application file for complete search history.

(56) References Cited

U.S. PATENT DOCUMENTS 5,203,002 A 4/1993 Wetzel

OTHER PUBLICATIONS

Glen Wetzel, The Parallel Access Processor (PAP), May 1989, 120 pgs., Thesis, California Polytechnic State University, San Luis Obispo, California.

*Primary Examiner*—Deandra M Hughes

(57) ABSTRACT

A computing system is described in which groups of individual instructions are executable in parallel by processing pipelines, and instructions to be executed in parallel by different pipelines are supplied to the pipelines simultaneously. During compilation of the instructions those which can be executed in parallel are identified. The system includes a register for storing an arbitrary number of the instructions to be executed. The instructions to be executed are tagged with pipeline identification tags and group identification tags indicative of the pipeline to which they should be dispatched, and the group of instructions which may be dispatched during the same operation. The pipeline and group identification tags are used to dispatch the appropriate groups of instructions simultaneously to the differing pipelines.

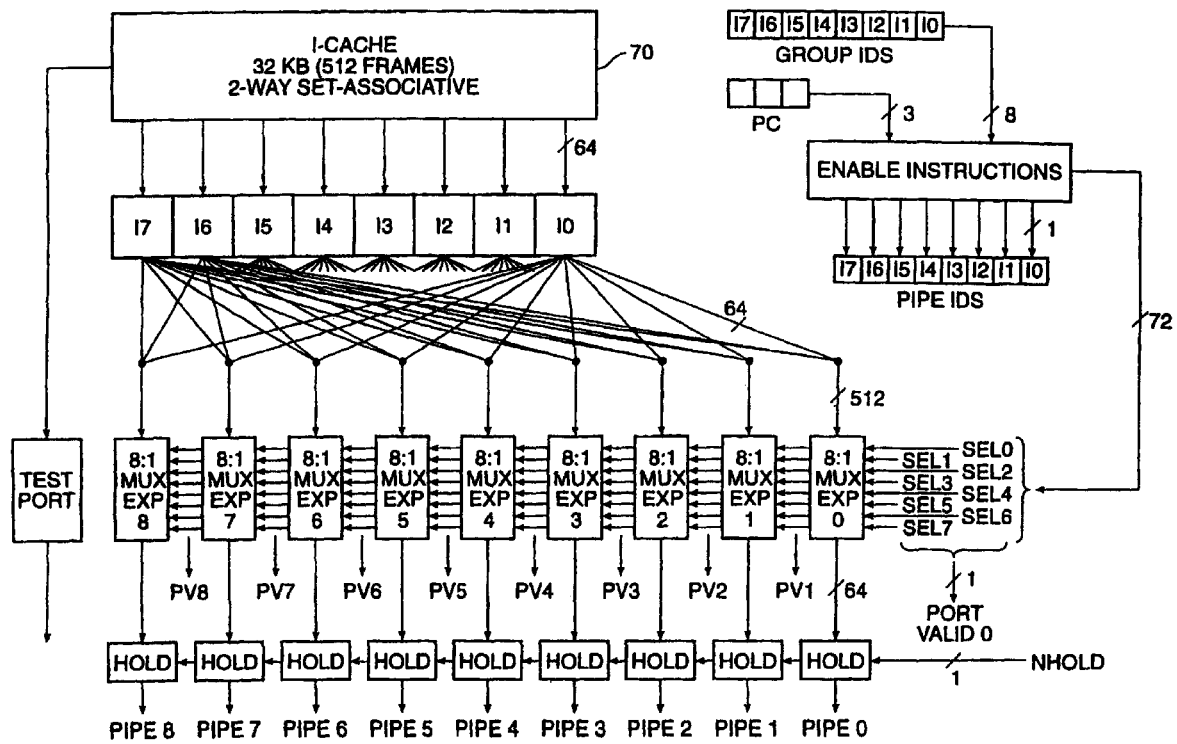

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1, 6, 10, 11, 16, 20 and 23 is confirmed.

Claims 2–5, 7–9, 12–15, 17–19 and 21–22 were not reexamined.

\* \* \* \* \*